United States Patent
Fujiwara et al.

(10) Patent No.: US 8,464,522 B2
(45) Date of Patent: Jun. 18, 2013

(54) CONTROL APPARATUS FOR INTERNAL COMBUSTION ENGINE

(75) Inventors: Takahiko Fujiwara, Susono (JP); Noriyasu Kobashi, Sunto-gun (JP); Yusuke Nakayama, Gotemba (JP); Mamoru Yoshioka, Susono (JP); Tsuyoshi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 12/671,085

(22) PCT Filed: Oct. 27, 2008

(86) PCT No.: PCT/JP2008/069833
§ 371 (c)(1),
(2), (4) Date: Jan. 28, 2010

(87) PCT Pub. No.: WO2009/066554
PCT Pub. Date: May 28, 2009

(65) Prior Publication Data
US 2010/0192543 A1    Aug. 5, 2010

(30) Foreign Application Priority Data

Nov. 21, 2007   (JP) .................................. 2007-301150

(51) Int. Cl.
*F01N 3/00*   (2006.01)
(52) U.S. Cl.
USPC ................... 60/295; 60/286; 60/297; 60/285
(58) Field of Classification Search
USPC .......................................... 60/286, 295, 297
See application file for complete search history.

(56) References Cited

U.S. PATENT DOCUMENTS

| 6,755,017 | B2 * | 6/2004 | Katashiba et al. | 60/301 |
| 7,013,638 | B2 * | 3/2006 | Hiranuma et al. | 60/286 |
| 2001/0045090 | A1 * | 11/2001 | Gray, Jr. | 60/278 |
| 2005/0022505 | A1 * | 2/2005 | Kitahara | 60/274 |
| 2006/0260299 | A1 * | 11/2006 | Wang et al. | 60/297 |
| 2007/0044455 | A1 * | 3/2007 | Barasa et al. | 60/295 |

(Continued)

FOREIGN PATENT DOCUMENTS

| DE | 199 52 830 A1 | 5/2001 |
| DE | 10 2005 013 707 A1 | 9/2006 |

(Continued)

OTHER PUBLICATIONS

Machine English Translation of JP2006-291850A to Hashizume, Takeshi.*

(Continued)

*Primary Examiner* — Thomas Denion
*Assistant Examiner* — Anthony Ayala Delgado
(74) *Attorney, Agent, or Firm* — Oliff & Berridge, PLC (57) ABSTRACT

An exhaust passage of an internal combustion engine is provided with an upstream side three-way catalyst capable of purifying exhaust gas and a particulate filter (PM filter) for trapping particulate matter PM contained in exhaust gas. Catalyst warm-up control is exercised for the purpose of warming up mainly the upstream side three-way catalyst at cold start. Filter regeneration control for removing the particulate matter PM accumulating on the particulate filter from the filter is exercised at the cold start after the catalyst warm-up control is exercised.

7 Claims, 2 Drawing Sheets

U.S. PATENT DOCUMENTS

| | | | |
|---|---|---|---|
| 2007/0130925 A1* | 6/2007 | Ueno | 60/295 |
| 2007/0137187 A1* | 6/2007 | Kumar | 60/299 |
| 2007/0256408 A1* | 11/2007 | Kogo et al. | 60/286 |
| 2009/0301437 A1* | 12/2009 | Mizoguchi et al. | 123/443 |
| 2010/0011749 A1* | 1/2010 | Fujiwara et al. | 60/286 |

FOREIGN PATENT DOCUMENTS

| | | |
|---|---|---|
| EP | 1 630 369 A2 | 3/2006 |
| JP | A 4-175415 | 6/1992 |
| JP | A 2003-206732 | 7/2003 |
| JP | A 2004-183506 | 7/2004 |
| JP | A 2006-097623 | 4/2006 |
| JP | 2006291850 A * | 10/2006 |
| JP | A 2006-307801 | 11/2006 |
| WO | WO 2008102793 A1 * | 8/2008 |

OTHER PUBLICATIONS

International Search Report issued in corresponding International Application No. PCT/JP2008/069833, mailed Jun. 4, 2009.

Written Opinion of the International Searching Authority issued in corresponding International Application No. PCT/JP2008/069833, mailed Jun. 4, 2009.

* cited by examiner

CONTROL APPARATUS FOR INTERNAL COMBUSTION ENGINE

TECHNICAL FIELD

The present invention relates generally to control apparatuses for an internal combustion engine, and more specifically, to a control apparatus suitable to control an internal combustion engine equipped in an exhaust passage with an exhaust gas purifying catalyst capable of purifying exhaust gas and with a particulate filter for trapping particulate filter PM.

BACKGROUND ART

For example, patent Document 1 discloses a diesel engine equipped in an exhaust passage with diesel smoke purifying means (oxidation catalyst and particulate filter). To prevent the temperature of the diesel smoke purifying means from elevating excessively in early times after the engine started, this conventional diesel engine is designed to prohibit performance of the regeneration of the particulate filter during a predetermined time after the engine started.

Including the above-mentioned document, the applicant is aware of the following documents as a related art of the present invention.

[Patent Document 1] Japanese Laid-open Patent Application Publication No. 2006-97623
[Patent Document 2] Japanese Laid-open Patent Application Publication No. Hei 4-175415

DISCLOSURE OF INVENTION

Problem to be Solved by the Invention

In the internal combustion engine equipped in an exhaust passage with an exhaust gas purifying catalyst being capable of purifying exhaust emission such as HC and NOx and with a particulate filter for trapping and removing a particulate matter PM, the following requests are present. That is to say, there is a request that want to warm up the exhaust gas purifying catalyst promptly until a certain activated temperature for the purpose of reducing the exhaust emission. In addition, there is a request that remove PM tending to be largely discharged in particular at the cold start from the particulate filter promptly before an air-fuel ratio control at the normal operation is started after PM accumulated on the particulate filter at the cold start.

The present invention has been made to solve the above-mentioned problem and it is an object of the invention to provide a control apparatus for an internal combustion engine, such as an internal combustion engine equipped in an exhaust passage with an exhaust gas purifying catalyst and particulate filter, that can promptly remove particulate matter PM accumulating on the particulate filter at the cold start while reducing exhaust emission promptly at the cold start.

Means for Solving Problems

The above object is achieved by a control apparatus for an internal combustion engine which includes an exhaust gas purifying catalyst disposed in an exhaust passage of the internal combustion engine and being capable of purifying exhaust gas. A particulate filter disposed in the exhaust passage and for trapping particulate matter contained in exhaust gas is also provided. A regeneration control execution means is further provided for executing filter regeneration control which regenerates the particulate filter on which the particulate matter accumulates. A warm-up control execution means is further provided for executing catalyst warm-up control which facilitates warm-up of the exhaust gas purifying catalyst at cold start of the internal combustion engine. A control timing adjustment means is further provided for adjusting control timing so that the filter regeneration control may be started after the catalyst warm-up control is started.

The above object is achieved by a control apparatus for an internal combustion engine that uses control for providing a stoichiometric air-fuel ratio as basic control for an air-fuel ratio. An exhaust gas purifying catalyst disposed in an exhaust passage of the internal combustion engine and being capable of purifying exhaust gas is also provided. A particulate filter disposed in the exhaust passage and for trapping particulate matter contained in exhaust gas is further provided. A regeneration control execution means is further provided for executing filter regeneration control which regenerates the particulate filter on which the particulate matter accumulates. A warm-up control execution means is further provided for executing catalyst warm-up control which facilitates warm-up of the exhaust gas purifying catalyst at cold start of the internal combustion engine. A control timing adjustment means is further provided for adjusting control timing so that the filter regeneration control may be started after the catalyst warm-up control is started.

In a third aspect of the present invention, the control timing adjustment means may start the filter regeneration control at the time when temperature of the particulate filter is reached to a temperature necessary to burn the particulate matter accumulating on the particulate filter after the catalyst warm-up control is started.

The fourth aspect of the present invention may include a fuel amount increase judgment means for judging whether or not fuel injection amount is increased at the cold start of the internal combustion engine. The control timing adjustment means may include regeneration control permission means for permitting the filter regeneration control to be started if it is judged that the fuel injection amount is increased.

The fifth aspect of the present invention may include a three-way catalyst disposed in the exhaust passage downstream of the exhaust gas purifying catalyst and particulate filter and having an oxygen storage capacity. An atmosphere gas state judgment means may be also provided for judging a state of atmosphere gas of the three-way catalyst. The control timing adjustment means may include regeneration control prohibition means for prohibiting the start of the filter regeneration control until the atmosphere of the three-way catalyst becomes a rich atmosphere.

The sixth aspect of the present invention may include an upstream side air-fuel sensor disposed in the exhaust passage upstream of the exhaust gas purifying catalyst to obtain information on an air-fuel ratio of exhaust gas at the position. A downstream side air-fuel sensor disposed in the exhaust passage downstream of the exhaust gas purifying catalyst and particulate filter to obtain information on an air-fuel ratio of exhaust gas at the position may be also provided. A feedback means may be further provided for correcting the fuel injection amount so that the air-fuel ratio of the exhaust gas supplied to the exhaust gas purifying catalyst may become a control target air-fuel ratio based on outputs of the upstream side air-fuel sensor and downstream side air-fuel sensor. The atmosphere gas state judgment means may judge the state of the atmosphere gas of the three-way catalyst based on the downstream side air-fuel sensor.

In a seventh aspect of the present invention, the control timing adjustment means may include regeneration control limit means that does not execute or discontinues the filter regeneration control when fuel cut of the internal combustion engine is performed, even if a state where the filter regeneration control should be started or is in execution is arrived.

In an eighth aspect of the present invention, the filter regeneration control may be the control that supplies the particulate filter with gas leaner than the present control target air-fuel ratio.

Effects Of The Invention

According to the first aspect of the present invention, the filter regeneration control can be performed after ensuring the temperature of the particulate filter adequately using heat obtained by performing the catalyst warm-up control prior to the filter regeneration control. Thus, it is possible to remove the particulate matter accumulating on the particulate filter promptly at the cold start, while promptly reducing the exhaust emission at the cold start.

According to the second aspect of the present invention, in the internal combustion engine (internal combustion engine which exercises the stoichiometric burn operation) that uses control for providing the stoichiometric air-fuel ratio as basic control for the air-fuel ratio, the filter regeneration control can be performed after ensuring the temperature of the particulate filter adequately using heat obtained by performing the catalyst warm-up control prior to the filter regeneration control. The internal combustion engine which exercises the stoichiometric burn operation has a characteristic that is likely to ensure sufficient high-temperature of the exhaust gas steadily compared to the internal combustion engine which exercises a lean burn operation even at the start. Therefore, the internal combustion engine which exercises the stoichiometric burn operation can warm up the exhaust gas purifying catalyst and elevate the temperature of the particulate filter preferably compared to the internal combustion engine which exercises the lean burn operation at the cold start. Therefore, according to the present invention, in the stoichiometric burn engine having the characteristic mentioned above, it is possible to preferably remove the particulate matter accumulating on the particulate filter promptly at the cold start, while promptly reducing the exhaust emission at the cold start due to exercising the adjustment of the control timing by the control timing adjustment means.

According to the third aspect of the present invention, by starting the filter regeneration control at the time when temperature of the particulate filter is reached to a temperature necessary to burn the particulate matter accumulating on the particulate filter after the catalyst warm-up control is started, it is possible to remove the particulate matter accumulating on the particulate filter promptly and surely at the cold start using heat obtained by performing the catalyst warm-up control.

According to the fourth aspect of the present invention, it is possible to exercise the filter regeneration control only if it can be judged that the accumulating amount of the particulate matter accumulating on the particulate filter will increase, thereby preventing the filter regeneration control from exercising unnecessarily.

According to the fifth aspect of the present invention, the filter regeneration control is exercised in the state where the atmosphere of the three-way catalyst disposed downstream of the particulate filter is constantly controlled to become the rich atmosphere. The three-way catalyst is the catalyst that has a characteristic capable of purifying ternary components (NOx, HC, CO) contained in the exhaust gas sufficiently by controlling the atmosphere of the catalyst to become the atmosphere of the air-fuel ratio near the stoichiometric. However, if the filter regeneration control is the control that supplies the particulate filter with an amount of oxygen larger than usual, the atmosphere of the three-way catalyst becomes a lean atmosphere when such filter regeneration control is exercised continuously over a long time. Accordingly, it is concerned that the purifying ability of NOx decreases. The present invention makes it possible to achieve a good balance between the assured avoidance of the decrease of the NOx purifying ability worried as a trade-off caused by performing the filter regeneration control and the regeneration of the PM filter 18 at the start.

According to the sixth aspect of the present invention, it is possible to preferably judge the atmosphere of the three-way catalyst disposed in the exhaust passage downstream of the particulate filter using the outputs of the air-fuel sensor equipped for the purpose of implementing the air-fuel ratio feedback control performed for the exhaust gas purifying catalyst.

The seventh aspect of the present invention makes it possible to avoid performing the unnecessary filter regeneration control as surely as possible by judging that the filter regeneration control has been completed if the fuel cut is performed in the state where heat obtained by the execution of the catalyst warm-up control is also supplied to the particulate filter.

The eighth aspect of the present invention makes it possible to preferably remove the particulate matter accumulating on the particulate filter by supplying the lean gas to the particulate filter, as the filter regeneration control, in the state where heat obtained by the execution of the catalyst warm-up control is also supplied to the particulate filter.

BEST MODE FOR CARRYING OUT THE INVENTION

Figure 1:
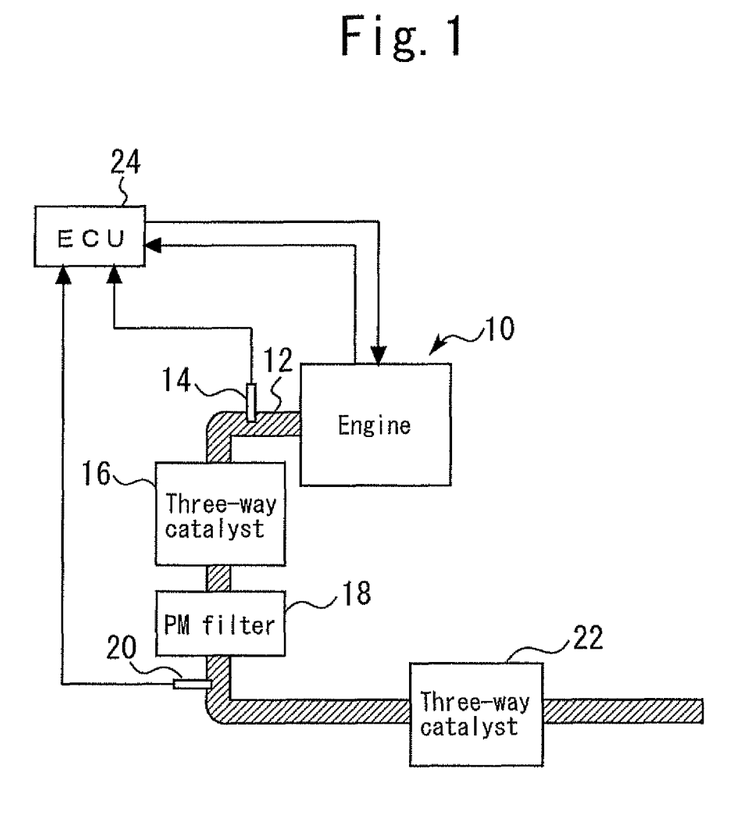
FIG. 1 is a schematic diagram for assistance in explaining an internal combustion engine system according to a first embodiment of the present invention.

First Embodiment
[Description Of System Configuration]
FIG. 1 is a schematic diagram for assistance in explaining an internal combustion engine system according to a first embodiment of the present invention. The system shown in FIG. 1 includes an internal combustion engine 10. This engine 10 is a stoichiometric burn engine which exercises, as basic control for an air-fuel ratio, control to provide a stoichiometric air-fuel ratio for combustion. Here, the internal combustion engine 10 is a gasoline engine that performs such stoichiometric burn operation, by way of example.

The internal combustion engine 10 is provided with an exhaust passage 12. A main linear A/F sensor (hereinafter simply abbreviated as "the A/F sensor") 14 is disposed in the exhaust passage 12 to detect an air-fuel ratio of exhaust gas discharged from the inside of a cylinder. The A/F sensor 14 is a sensor that issues an output generally linear with respect to the air-fuel ratio of the exhaust gas.

An upstream side three-way catalyst 16 capable of purifying ternary components (NOx, HC, CO) contained in the exhaust gas is disposed in the exhaust passage 12 downstream of the A/F sensor 14. A particulate filter (hereinafter referred to as "the PM filter") 18 capable of trapping and removing particulate matter PM (hereinafter simply abbreviated as "PM") contained in the exhaust gas is disposed in the exhaust passage 12 downstream of the upstream side three-way catalyst 16.

A sub O2 sensor 20 is disposed in the exhaust passage 12 downstream of the PM filter 18 to make a signal in response to whether an air-fuel ratio at that position is rich or lean. Further, a downstream side three-way catalyst 22 capable of purifying the above-mentioned ternary components contained in the exhaust gas is disposed in the exhaust passage 12 downstream of the sub O2 sensor 20. Incidentally, the air-fuel ratio sensor disposed upstream of the upstream side three-way catalyst 16 may be an oxygen sensor having the same configuration as the sub O2 sensor 20 instead of the main linear A/F sensor 14 mentioned above.

The system shown in FIG. 1 includes an ECU (Electronic Control Unit) 24. Various sensors (not shown) as well as the A/F sensor 14 and sub O2 sensor 20 mentioned above are connected to the ECU 24 to measure various information (engine cooling water temperature, an amount of intake air, engine speed, a throttle angle, an accelerator angle, etc.) for controlling the internal combustion engine 10. In addition, various actuators (not shown) such as a throttle valve, a fuel injection valve, an ignition plug, etc. are connected to the ECU 24.

(Air-Fuel Ratio Feedback Control)

The internal combustion engine 10 of the present embodiment is an internal combustion engine that performs stoichiometric burn operation under, as basic control for the air-fuel ratio, control to provide a stoichiometric air-fuel ratio as described above. More specifically, the present embodiment exercises air-fuel ratio feedback control described below using the outputs of the A/F sensor 14 and of the sub O2 sensor 20 to control the air fuel ratio into a value close to the stoichiometric air-fuel ratio.

That is to say, the system of the present embodiment exercises the main feedback control based on the output of the upstream side A/F sensor 14, and exercises the sub feedback control based on the output of the downstream side sub O2 sensor 20. In the main feedback control, an amount of fuel injection is controlled to allow the air fuel ratio of the exhaust gas flowing into the upstream side three-way catalyst 16 to agree with the control target air fuel ratio. In the sub feedback control, the contents of the main feedback control are corrected so that the air-fuel ratio of the exhaust gas flowing out downstream of the upstream side three-way catalyst 16 may become the stoichiometric air-fuel ratio.

(Catalyst Warm-Up Control)

In the present embodiment, catalyst warm-up control which facilitates the warm-up of the upstream side three-way catalyst 16 and downstream side three-way catalyst 22 (primarily, the upstream side three-way catalyst 16) is exercised to elevate the floor temperatures promptly to a predetermined activation temperature at cold start. More specifically, examples of such catalyst warm-up control include measures such as retarding the ignition timing and making the air-fuel ratio lean.

The control retarding the ignition timing makes it possible to elevate the temperature of the exhaust gas discharged from a cylinder, thereby allowing hot exhaust gas to be supplied to the upstream side three-way catalyst 16 and downstream side three-way catalyst 22. In addition, the control making the air-fuel ratio lean makes it possible to accelerate the activation timing of the upstream side three-way catalyst 16 and downstream side three-way catalyst 22.

According to such catalyst warm-up control, it is possible to promptly activate the three-way catalysts 16, 22, thereby preferably reducing exhaust emission (more specifically, ternary components (NOx, HC, CO) contained in the exhaust gas) from a relatively-early stage during the cold start.

(PM Trapping by the PM Filter and Filter Regeneration Control)

The PM filter 18 shown in FIG. 1 traps PM contained in exhaust gas to suppress the PM discharged into the atmosphere. In order to continuously trap PM, the system equipped with such a PM filter 18 needs filter regeneration control in which the trapped PM is removed to regenerate the trapping capability of the PM filter 18. Examples of such filter regeneration control include processing in which the PM filter 18 is put under a high-temperature and a lean atmosphere to burn and remove the trapped PM.

More specifically, in the circumstances where the floor temperature of the PM filter 18 is equal to or greater than the temperature necessary to burn the particulate matter PM accumulating on the PM filter 18, the filter regeneration control is the control that supplies a gas leaner than the current control target air-fuel ratio to the PM filter 18, by controlling the air-fuel ratio to the air-fuel ratio leaner than the current control target air-fuel ratio, or by supplying secondary air to the exhaust passage 12 upstream of the PM filter 18. That is to say, according to the filter regeneration control, an oxygen amount larger than usual can be supplied to the PM filter 18.

(Fuel Amount Increase Control (A/F Rich Control) at Cold Temperature)

Further, during states where the fuel is hard to vaporize, such as a state immediately after the cold start, the system according to the present embodiment may exercise control making the air-fuel ratio A/F rich in order to ensure the drivability of the internal combustion engine 10.

[Feature Portions of the First Embodiment]

An amount of PM discharged from a cylinder becomes large especially under a state immediately after the cold start. In addition, PM tends to be discharged as the air-fuel ratio being controlled becomes richer. For this reason, the discharge amount of PM becomes large if the above-described fuel amount increase control at cold temperature is exercised at the cold start. As a result, a PM amount accumulating on the PM filter 18 becomes large.

In the present embodiment, to achieve the state where PM has been preferably removed from the PM filter 18 when the air-fuel ratio control at the normal operation (i.e. the above-mentioned feedback control for controlling the control target air-fuel ratio to become the stoichiometric air-fuel ratio) starts in response to the activation of the three-way catalysts 16, 22, control that aims to promptly remove PM accumulating on the PM filter 18 at the cold start while reducing the exhaust emission promptly at the cold start is exercised. More specifically, the present embodiment exercises the control in the order described below.

That is to say, the present embodiment accords the start of the catalyst warm-up control priority over the start of the filter regeneration control. More specifically, the present embodiment exercises the above-mentioned filer regeneration control (for example, the control for making the control target air-fuel ratio lean) after the catalyst warm-up control that facilitates the warm-up of the three-way catalysts 16, 22 has been exercised during the cold start.

In addition, the present embodiment judges whether it is necessary to exercise the filter regeneration control according to whether the fuel amount increase control at cold temperature is exercised at the cold start. More specifically, the present embodiment exercises the filter regeneration control if the fuel amount increase control at cold temperature is exercised at the cold start.

Further, the present embodiment exercises the filter regeneration control after the atmosphere gas of the downstream side three-way catalyst 22 disposed downstream of the PM filter 18 is controlled to become a rich state (oxygen release state).

Further, if a process for stopping fuel supply to the internal combustion engine 10 (i.e. fuel cut) is performed at the period between a time point capable of judging that the floor temperature of the PM filter 18 is equal to or larger than the temperature necessary to burn PM accumulating on the PM filter 18 because the catalyst warm-up control has been completed, and a time point when the filter regeneration control is completed thereafter, the present embodiment ceases to exercise the filter regeneration control since such fuel cut has been performed.

Figure 2:
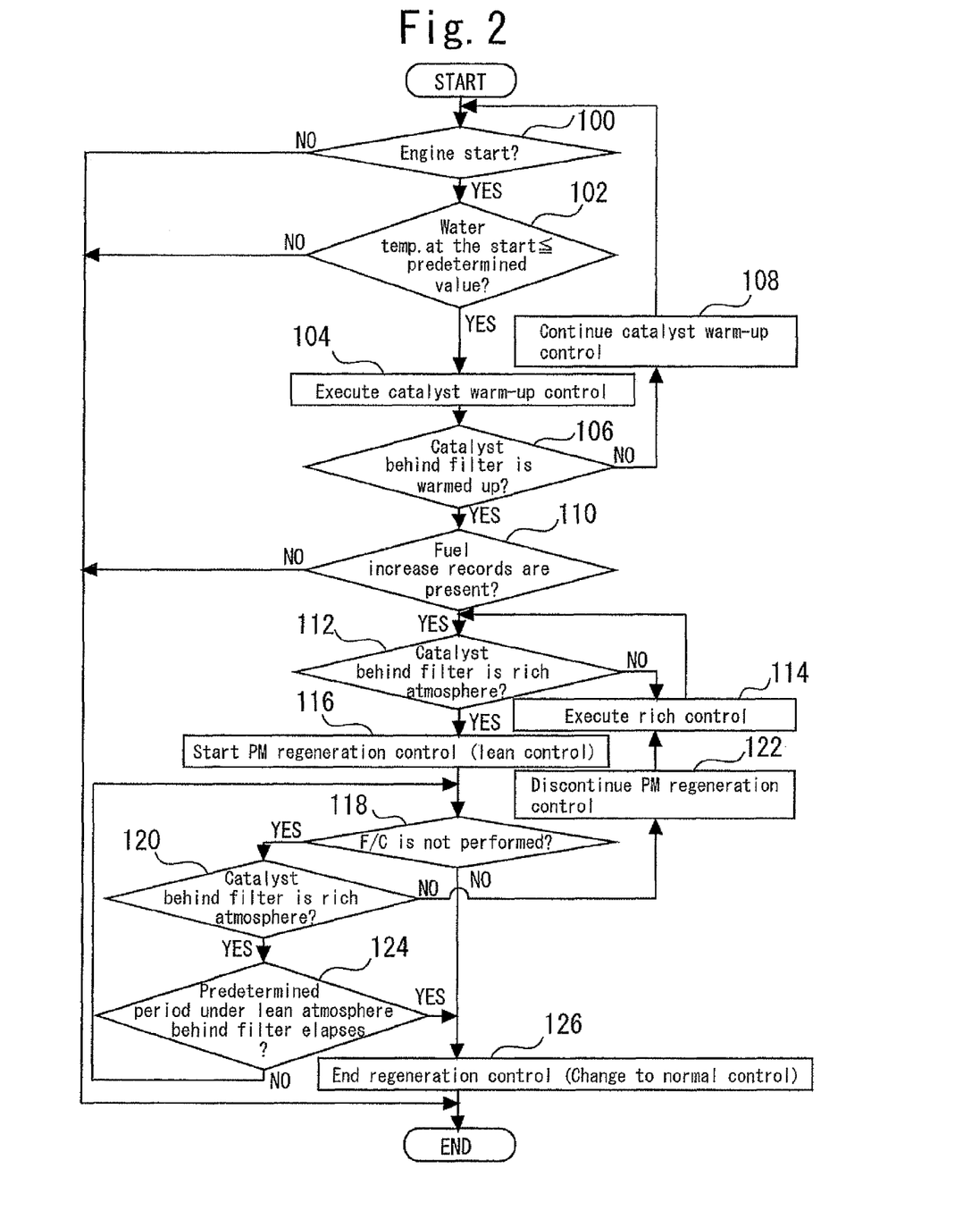
FIG. 2 is a flowchart representing a routine that is executed in the first embodiment of the present invention.

FIG. 2 is a flowchart illustrating a routine that the ECU 24 performs in order to implement the above functionality.

The routine shown in FIG. 2 first perform step 100 to judge whether initiation of engine operation is done. If the judgment result obtained in step 100 indicates that the initiation of engine operation is done, step 102 is performed to judge whether a temperature of the engine cooling water is equal to or smaller than a predetermined value.

If the judgment result obtained in step 102 indicates that the temperature of the engine cooling water is equal to or smaller than the predetermined value, that is, if the judgment result indicates that the internal combustion engine 10 is cold, the catalyst warm-up control described above is exercised (step 104). Then, step 106 is performed to judge whether the warm-up of the downstream side three-way catalyst (the catalyst disposed behind the filter) 22 has been completed, that is, whether the downstream side three-way catalyst 22 has been activated. Incidentally, it can be judged that the upstream side three-way catalyst 16 disposed upstream of the downstream side three-way catalyst 22 has been also activated if the catalyst 22 has been activated.

If the judgment result obtained in step 106 indicates that the warm-up of the downstream side three-way catalyst is not completed, the catalyst warm-up control is continued (step 108). If, on the other hand, the warm-up of the downstream side three-way catalyst 22 is completed, step 110 is performed to judge whether the records indicating that the fuel amount increase control at cold temperature was performed during the current cold start are present.

If the judgment result obtained in step 110 indicates that the records indicating that the fuel amount increase control at cold temperature was performed during the current cold start are present, step 112 is performed to judge whether an atmosphere of the downstream side three-way catalyst (the catalyst disposed behind the filter) 22 is a rich atmosphere. More specifically, step 112 is performed to judge whether the atmosphere of the downstream side three-way catalyst 22 is the rich atmosphere, using the outputs of the sub O2 sensor disposed downstream of the PM filter 18 (i.e. upstream of the downstream side three-way catalyst 22), by the estimating method based on parameters such as the state of the air-fuel ratio of the exhaust gas supplied to the downstream side three-way catalyst 22 and the amount of the exhaust gas supplied to it.

If the judgment result obtained in step 112 indicates that the atmosphere of the downstream side three-way catalyst 22 is not the rich atmosphere, rich control that controls so that the control target air-fuel ratio may become an air-fuel ratio richer than the stoichiometric air-fuel ratio is performed for controlling the atmosphere of the downstream side three-way catalyst 22 to become the rich atmosphere (step 114).

If, on the other hand, the judgment result obtained in step 112 indicates that the atmosphere of the downstream side three-way catalyst 22 is the rich atmosphere, step 116 is performed to start the filter regeneration control (PM regeneration control). More specifically, as described above, lean control that controls so that the control target air-fuel ratio may become an air-fuel ratio leaner than the stoichiometric air-fuel ratio is performed here as the filter regeneration control.

Next, step 118 is performed to judge whether fuel cut F/C is not performed. If the judgment result indicates that the fuel cut F/C is not performed, step 120 is performed to judge whether the atmosphere of the downstream side three-way catalyst (the catalyst disposed behind the filter) 22 is the rich atmosphere. More specifically, step 120 is performed to judge whether the atmosphere of the downstream side three-way catalyst 22 maintains the rich atmosphere after the filter regeneration control by the lean control is started.

If the judgment result obtained in step 120 indicates that the atmosphere of the downstream side three-way catalyst 22 does not keep the rich atmosphere, step 122 is performed to discontinue performance of the filter regeneration control (PM regeneration control). Then, the rich control is performed in above step 114.

If, on the other hand, the judgment result in step 120 indicates that the atmosphere of the downstream side three-way catalyst 22 maintains the rich atmosphere, step 124 is performed to judge whether a state where the atmosphere of the exhaust gas at a downstream portion of the PM filter 18 is the lean atmosphere continues over a predetermined period of time on the basis of the outputs of the sub O2 sensor 20. the process in above step 118 for judging whether the fuel cut is not performed, and the process in above step 120 for judging whether the atmosphere of the downstream side three-way catalyst 22 is the rich atmosphere are repeatedly performed until the predetermined period of time elapses. According to such processes, the filter regeneration control is performed continuously in the state where the atmosphere of the downstream side three-way catalyst 22 is constantly maintained to be the rich atmosphere as long as the fuel cut is not performed. Incidentally, the predetermined period of time is changed according to the PM amount accumulating on the PM filter 18.

If the judgment in above step 124 is established, or if it is judged in above step 118 that the fuel cut is performed, step 126 is performed to end the filter regeneration control and change the air-fuel ratio control to the air-fuel ratio feedback control at the normal operation.

According to the routine that has been described above with reference to FIG. 2, at the cold start of the internal combustion engine 10, the filter regeneration control is performed after the catalyst warm-up control is performed. As described above, in the system according to the present embodiment, the catalyst warm-up control is performed at the cold start to promptly activate the upstream side three-way catalyst 16 mainly of the three-way catalysts 16, 22.

If, for example, the catalyst warm-up control with retarding the ignition timing is performed, high-temperature exhaust gas is supplied to not only the three-way catalysts 16, 22 but also the PM filter 18. Therefore, it is possible to elevate the temperature of the three-way catalysts 16, 22 to a certain activating temperature and also to elevate the temperature of the PM filter 18 to the temperature necessary to burn and remove PM accumulating on the PM filter 18. That is to say, heat provided to the exhaust system to warm up the three-way catalysts 16, 22 can be utilized to elevate the temperature of the PM filter 18.

If, on the other hand, the catalyst warm-up control with making the air-fuel ratio lean is performed, the activation of the upstream side three-way catalyst 16 can be facilitated. Consequently, the warm-up of the upstream side three-way catalyst 16 can be facilitated by the reaction heat arising within the three-way catalyst 16, and this reaction heat can be also provided to the PM filter 18 disposed downstream of the three-way catalyst 16. Thus, the temperature of the PM filter 18 can be elevated to the temperature necessary to burn and remove PM. In this case, as with the retard of the ignition timing, heat obtained in order to warm up the three-way catalysts 16, 22 can be utilized to elevate the temperature of the PM filter 18.

Therefore, according to the routine described above, the filter regeneration control can be performed after ensuring the temperature of the PM filter 18 adequately using heat obtained by performing the catalyst warm-up control prior to the filter regeneration control. Thus, it is possible to remove PM accumulating on the PM filter 18 promptly at the cold start, while promptly reducing the exhaust emission at the cold start. In addition, it is possible to achieve the state where PM has been removed from the PM filter 18 preferably when the air-fuel ratio control at the normal operation (i.e. the above-mentioned feedback control for controlling the control target air-fuel ratio to become the stoichiometric air-fuel ratio) starts in response to the activation of the three-way catalysts 16, 22.

Further, as described above, the internal combustion engine 10 according to the present embodiment is the stoichiometric burn engine which exercises, as the basic control of the air-fuel ratio, the control to provide the stoichiometric air-fuel ratio for combustion. Such internal combustion engine 10 which exercises the stoichiometric burn operation has a characteristic that is likely to ensure sufficient high-temperature of the exhaust gas steadily compared to the internal combustion engine which exercises a lean burn operation (such as the diesel engine and the gasoline lean burn engine) even at the start. Therefore, the internal combustion engine 10 which exercises the stoichiometric burn operation can warm up the three-way catalysts 16, 22 and elevate the temperature of the PM filter 18 preferably compared to the internal combustion engine which exercises the lean burn operation at the cold start. That is to say, the internal combustion engine 10 which exercises the stoichiometric burn operation has prominent adequacy as an internal combustion engine executing the control of the routine described above and can sufficiently accomplish a successful outcome by the above-described routine.

In addition, according to the routine described above, if the catalyst warm-up control is exercised and the records indicating that the fuel amount increase control at cold temperature was performed during the current cold start are present, the execution of the filter regeneration control is permitted. In other words, if a large amount of PM does not accumulate on the PM filter 18 and the rich burn operation (fuel amount increase control at cold temperature) is not performed at the current cold start such as the re-start in the state where the internal combustion engine 10 has been already warmed up, the execution of the filter regeneration control is prohibited. As described above, because PM is discharged a lot at the rich burn operation, the discharge amount of PM becomes large if the records indicating that the fuel amount increase control at cold temperature was performed are present. Accordingly, it can be judged that the PM amount accumulating on the PM filter 18 has become a lot.

Lean gas is also supplied to the downstream side three-way catalyst 22 downstream of the PM filter 18 because the filter regeneration control is the control that supplies the PM filter 18 with an amount of oxygen larger than usual as described above. Accordingly, it is concerned that the discharge amount of NOx increases when the atmosphere of the downstream side three-way catalyst 22 becomes the lean atmosphere due to executing the filter regeneration control excessively. In addition, in the case where the filter regeneration control is implemented by the method providing the secondary air from outside, the electrical load necessary to drive the pump for supplying such a secondary air is caused to increase by the excessive execution of the filter regeneration control.

In contrast, according to the method by the routine described above, by judging whether it is necessary to exercise the filter regeneration control according to whether the fuel amount increase control at cold temperature was exercised, it is possible to exercise the filter regeneration control only if it can be judged that the PM accumulating amount will increase, thereby preventing the filter regeneration control from exercising unnecessarily.

The downstream side three-way catalyst 22 used for the internal combustion engine 10 which exercises the stoichiometric burn operation according to the present embodiment is the catalyst that has a characteristic capable of purifying ternary components (NOx, HC, CO) contained in the exhaust gas sufficiently by controlling the atmosphere of the catalyst 22 to become the atmosphere of the air-fuel ratio near the stoichiometric. However, as described above, Oxygen (lean gas) is necessary to burn and remove PM accumulating on the PM filter 18. If the supply of the lean gas to the downstream side three-way catalyst 22 for burning and removing PM lasts a long time, the atmosphere of the downstream side three-way catalyst 22 becomes the lean atmosphere. Accordingly, it is concerned that the purifying ability of NOx decreases.

According to the routine described above, the filter regeneration control is exercised in the state where the atmosphere of the downstream side three-way catalyst 22 is constantly controlled to become the rich atmosphere. If the filter regeneration control that supplies the PM filter 18 with an amount of oxygen larger than usual is exercised, it is concerned that the purifying ability of NOx decreases described above. However, exercising control in the above manner makes it possible to achieve a good balance between the assured avoidance of the decrease of the NOx purifying ability and the regeneration of the PM filter 18 at the start.

Further, according to the system configuration of the present embodiment, it is possible to preferably judge the atmosphere of the downstream side three-way catalyst 22 using the outputs of the sub O2 sensor 20 disposed downstream of the upstream side three-way catalyst 16 for the purpose of implementing the air-fuel ratio feedback control performed for the upstream side three-way catalyst 16. In addition, according to the present embodiment, because the sub O2 sensor 20 equipped in the exhaust passage 12 for the purpose described above is disposed downstream of the PM filter 18, it is also possible to preferably judge the time point that should complete the PM regeneration control in above step 124 using the outputs of the sub O2 sensor 20.

Further, according to the routine described above, the filter regeneration control is discontinued when the fuel cut is performed at the period between the time point (time point that the judgment of above 106 is established) capable of judging that the floor temperature of the PM filter 18 is equal to or greater than the temperature necessary to burn PM accumulating on the PM filter because the catalyst warm-up control has been completed, and the time point (time point that the judgment of above step 124 is established) when the filter regeneration control is completed thereafter. If the fuel cut is performed, the PM filter 18 receives the amount of oxygen more sufficient than when the filter regeneration control with making the air-fuel ratio lean is exercised. If such fuel cut is performed, the internal combustion engine 10 ceases to generate torque. Therefore, the fuel cut is not the control being able to be arbitrarily performed due to requests from the system, but the fuel cut is the control performed at random due to the change of the operating state of the vehicle in response to requests from the driver.

In present embodiment, if the fuel cut is performed in the state where the temperature of the PM filter 18 is high because the catalyst warm-up control has been completed, it is judged that a condition where the PM filter 18 is put under the high-temperature and lean atmosphere is established, and that the regeneration of the PM filter 18 has been completed. Exercising such a process makes it possible to avoid performing the unnecessary filter regeneration control as surely as possible.

The first embodiment, which has been described above, the filter regeneration control is started after the catalyst warm-up control has been completed at the cold start. However, in the present invention, the start timing of the filter regeneration control for utilizing the heat generated by the execution of the catalyst warm-up control for the temperature-increase of the PM filter 18 is not limited to the above timing. More specifically, for example, the filter regeneration control may be exercised during the execution of the catalyst warm-up control even if the start timing of the filter regeneration control is after the catalyst warm-up control is started. Specifically, for example, the lean control for the air-fuel control may be exercised with the ignition timing retard control for warming up the catalyst at the timing later than the start timing of the ignition timing retard control.

In addition, if the fuel cut is performed at the period from the completion of the catalyst warm-up control to the completion of the filter regeneration control, the first embodiment, which has been described above, ceases to exercise the filter regeneration control since such fuel cut has been performed. However, the present invention is not limited to such a control. More specifically, if the fuel cut is performed before the start of the filter regeneration control under the state where the temperature of the PM filter 18 has been elevated to the temperature necessary to burn and remove PM after completion of the catalyst warm-up control or during the execution of it, the filter regeneration control at the current cold start may not be performed on the basis of the judgment that the regeneration of the PM filter 18 has been completed due to the performance of the fuel cut.

In addition, the first embodiment, which has been described above, an example where the exhaust gas purifying catalyst mainly targeted for the catalyst warm-up control is the upstream side three-way catalyst 16 has been described. However, in the present invention, the configuration of the exhaust gas purifying catalyst targeted for the catalyst warm-up control is not limited to such a three-way catalyst.

Incidentally, in the first embodiment, which has been described above, the "regeneration control execution means" according to the first or second aspect of the present invention is implemented when the ECU 24 performs the processes of steps 116, 124, and 126. In addition, the "warm-up control execution means" according to the first or second aspect of the present invention is implemented when the ECU 24 performs the process of step 104. In addition, the "control timing adjustment means" according to the first or second aspect of the present invention is implemented when the ECU 24 performs the control in accordance with the procedure of the routine shown in FIG. 2 described above.

Further, the "fuel amount increase judgment means" according to the fourth aspect of the present invention is implemented when the ECU 24 performs the process of step 110. In addition, the "regeneration control permission means" according to the fourth aspect of the present invention is implemented when the ECU 24 performs the process of step 116 if the judgment in step 110 is established.

Further, the "atmosphere gas state judgment means" according to the fifth aspect of the present invention is implemented when the ECU 24 performs the processes of step 112 or 120. In addition, the "regeneration control prohibition means" according to the fifth aspect of the present invention is implemented when the ECU 24 does not perform the process of step 116 until the process of step 112 is established or the ECU 24 performs the process of step 122 (if the process of step 120 is not established).

Further, the "feedback means" according to the sixth aspect of the present invention is implemented when the ECU 24 performs the feedback control of the air-fuel ratio described above aimed at the upstream side of the three-way catalyst 16 using the outputs of the main linear A/F sensor 14 and sub O2 sensor 20.

Further, the "regeneration control limit means" according to the seventh aspect of the present invention is implemented when the ECU 24 proceeds to step 126 if the judgment in step 118 is not established.

The invention claimed is:

1. A control apparatus for an internal combustion engine, comprising:

a first three-way catalyst disposed in an exhaust passage of the internal combustion engine and capable of purifying exhaust gas;

a particulate filter, disposed in the exhaust passage downstream from the particulate filter, for trapping particulate matter contained in exhaust gas;

a second three-way catalyst disposed in the exhaust passage downstream of the first three-way catalyst and the particulate filter, wherein the second three-way catalyst has an oxygen storage capacity; and an electronic control unit including program logic that, when executed by the electronic control unit, executes filter regeneration control which regenerates the particulate filter on which the particulate matter accumulates;

executes catalyst warm-up control which facilitates warm-up of the first three-way catalyst at cold start of the internal combustion engine;

adjusts control timing so that the filter regeneration control is started after the catalyst warm-up control is started;

judges a state of richness of atmosphere gas of the second three-way catalyst; and prohibits a start of the filter regeneration control until the atmosphere of the second three-way catalyst becomes a rich atmosphere, wherein the control apparatus uses control for providing a stoichiometric air-fuel ratio as basic control for an air-fuel ratio.

2. The control apparatus according to claim 1, wherein the electronic control unit further includes program logic that, when executed by the electronic control unit, starts the filter regeneration control at a time when temperature of the particulate filter is reached to a temperature necessary to burn the particulate matter accumulating on the particulate filter after the catalyst warm-up control is started.

3. The control apparatus according to claim 1, wherein
the electronic control unit further includes program logic
that, when executed by the electronic control unit,
judges whether or not fuel injection amount has been increased at the cold start of the internal combustion engine; and
permits the filter regeneration control to be started if it is judged that the fuel injection amount has been increased.

4. The control apparatus according to claim 1, further comprising:
an upstream side air-fuel ratio sensor disposed in the exhaust passage upstream of the first three-way catalyst to obtain information on an air-fuel ratio of exhaust gas at the position; and
a downstream side air-fuel ratio sensor disposed in the exhaust passage downstream of the first three-way catalyst and the particulate filter to obtain information on an air-fuel ratio of exhaust gas at the position,
wherein the electronic control unit further includes program logic that, when executed by the electronic control unit,
corrects a fuel injection amount so that the air-fuel ratio of the exhaust gas supplied to the first three-way catalyst becomes a control target air-fuel ratio based on outputs of the upstream side air-fuel ratio sensor and downstream side air-fuel ratio sensor; and
judges the state of the atmosphere gas of the second three-way catalyst based on the output of the downstream side air-fuel sensor.

5. The control apparatus according to claim 1, wherein the electronic control unit further includes program logic that, when executed by the electronic control unit, does not execute or discontinues the filter regeneration control when fuel cut of the internal combustion engine is performed, even if a state where the filter regeneration control should be started or is in execution is arrived.

6. The control apparatus according to claim 1, wherein the filter regeneration control is the control that supplies the particulate filter with gas leaner than the present control target air-fuel ratio.

7. The control apparatus according to claim 1,
wherein the control apparatus further includes a sensor for judging a state of richness of atmospheric gas of the second three-way catalyst, and
wherein the sensor is located upstream from the second three-way catalyst.

* * * * *